United States Patent [19]
Huang et al.

[11] Patent Number: 5,865,698
[45] Date of Patent: Feb. 2, 1999

[54] REAR DERAILLEUR FOR USE IN BICYCLES

[75] Inventors: Jack Huang, Tainan; Chung-Ping Chiang, Taipai; Chan-Hua Feng, Hsinchu, all of Taiwan

[73] Assignee: Industrial Technology Research Institute, Hsinchu, Taiwan

[21] Appl. No.: 887,539

[22] Filed: Jul. 3, 1997

[51] Int. Cl.⁶ .................................................. F16H 9/00
[52] U.S. Cl. ............................................. 474/82; 474/80
[58] Field of Search ......................................... 474/80, 82

[56] References Cited

U.S. PATENT DOCUMENTS

| | | | |
|---|---|---|---|
| 3,979,962 | 9/1976 | Kebsch | 474/82 |
| 4,619,633 | 10/1986 | Nagano | 474/82 |
| 5,533,937 | 7/1996 | Patterson et al. | 474/80 |
| 5,620,384 | 4/1997 | Kojima et al. | 474/82 |

FOREIGN PATENT DOCUMENTS 616877  11/1942  United Kingdom ..................... 474/82

Primary Examiner—Thomas R. Hannon
Attorney, Agent, or Firm—W. Wayne Liauh

[57] ABSTRACT

An improved rear derailleur for changing the gear ratio of a bicycle is disclosed. It includes a fixed member, a movable member, a parallelogram mechanism connecting the fixed member with the movable member, and a cable adjusting screw which is screwed to a screw socket fixed on the fixed member. The cable adjusting screw is connected to a first end of a cable, wherein the cable has a second end fixed to a movable member. The cam member comprises a guiding surface for guiding the cable between the cable adjusting screw and the movable member. The guiding surface of the cam member is structured substantially coinciding a portion of a fictitious circle centered at a rotating pin which connects an outer linkage of the parallelogram with a second end of the fixed member. Furthermore, the cable adjusting screw is positioned in such a manner that its extension is always substantially tangential to the guiding surface of the cam member, so as to allow the cable to be pulled in a direction substantially coincident with the axial extension of the cable adjusting screw.

2 Claims, 9 Drawing Sheets

REAR DERAILLEUR FOR USE IN BICYCLES

BACKGROUND OF THE INVENTION

1. Field of the Invention

The present invention relates to a rear derailleur structure which is affixed to the rear fork of a bicycle. The rear derailleur structure disclosed in the present invention utilizes a cam member to provide uniformity of operational force as the rider shifts the driving chain from one sprocket to another sprocket of a multistage sprocket assembly mounted on the bicycle frame. The improved rear derailleur structure disclosed in the present invention can, at the same time, reduce the possibility of indexing error of the derailleur caused by the protruding length of the cable adjusting screw, as often observed in the prior art derailleurs.

2. Description of the Prior Art

In recent years, the structure of most of the derailleurs taught in prior art mainly includes a fixed member, a moveable member, a pair of mutually parallel linkage, an upper guide pulley and a lower guide pulley, and a return spring. The two ends of the linkage set are connected to the fixed member and the moveable member, respectively, by a rotating pin. The upper guide pulley and the lower guide pulley are connected to the chain guide to form a guide pulley set. And the set of guide pulleys are connected to the moveable member by the rotating pin.

One end of shifting cable is fixed on the shifting lever, and the other end of the shifting cable passes through a cable adjusting screw and is then fastened on the fixed screw of the shifting cable which is settled on the outer linkage. By pulling the shifting cable for changing speed, the inner and outer linkages of parallelogram mechanism rotate around the pin of the fixed member to cause the moveable member and the set of guide pulleys to be moved outward or inward along with axis of freewheel assembly and thereby move the guide pulley to the alignment position of a respective sprocket of the freewheel assembly in order to shift a driving chain and thereby change speed.

When the rider wishes to shift the driving chain from a smaller sprocket to a larger sprocket, the pulling effort exerted by the shifting cable should be able to overcome the resistance exerted by the return spring of parallelogram mechanism (i.e., should be large enough to change the morphology of parallelogram mechanism), and thereby be able to move the guide pulley set and the driving chain inwardly along the axis of the freewheel assembly. When the rider wishes to shift the chain from the larger sprocket to the smaller sprocket, by means of loosening the shifting cable, the return force exerted by return spring will move the guide pulley set outwardly along the axis of the freewheel assembly in order to shift the chain and thereby to change speed.

The prior art is designed according to the operational principle mentioned above. However, in practice use, the defects of the control performance and indexing error of derailleur under the pre-determined stroke of index shifter can be explained as follows:

(1) As shown from FIGS. 1A through 1F, in the prior art devices, the actual pulling angle of cable (α) varies during the shifting procedure. When the chain is shifted from a smaller sprocket to a larger sprocket, the distance between the fixed screw of the cable and the adjusting screw cable becomes closer and thereby the active length of cable become shorter. When the guide pulley has a certain upward movement at the axis of freewheel assembly, the actual pulling of cable changes too much and the portion of the cable leaving the adjusting screw becomes folded so that friction and pulling effort of cable to shift chain increase rapidly. Therefore, it will cause the rider to feel the shifting operation uncomfortable. In the meantime, the shifting cable will be easily broken down by long-term friction.

(2) The effect of protruding length L of adjusting screw 20 of prior art on the active length (L1, L2) of cable 21 is shown in FIG. 2A. When the adjusting screw is being screwed in and out for making the adjustment for guide pulley's initial position, the different protruding length of cable adjusting screw 20 will change the active length L of steel cable, wherein initial actual pulling angle of cable (α1, α2) be changed. It indicates that the relationship between the change of active length of cable in guide pulley's working area and the change of position of guide pulley changes. Therefore, the chain guide and the guide pulley will often fail to move to the appropriate position as intended within a certain change of cable by using the index type of shifting lever. The function for changing speed will thereby become lower and will even fail.

SUMMARY OF THE INVENTION

The present invention provides a rear derailleur installed on the rear fork end of bicycle. The outer linkage of the derailleur is connected with a cam member. The main profile of cam structure of the cam member has a circular shape. When the cam structure is connected to the outer linkage, the center of the circular-shaped cam is located on the extension line of the axis of a rotating pin which connects the outer linkage with the fixed member. In the meantime, when pulling the shifting cable which causes the outer linkage to rotate, the moving path of the cam structure of cam member always remains on one side of an extension from the cable adjusting screw.

The cam structure preferably is made of a low coefficient of friction material. In practice use, one end of the shifting cable of the derailleur connects with the shifting lever. The casing of the other end of the shifting cable is stopped at the cable adjusting screw which is installed on the fixed member. The shifting cable passes through the adjusting screw, wraps around the cam structure of cam part, and is fastened on the cable fixing screw of outer linkage.

During the shifting operation, the rider pulls the shifting cable in order to change the morphology of parallelogram mechanism of the derailleur to move the guide pulley and the chain guide for changing speed. In this process, the actual pulling angle of shifting cable maintains constant in the entire working range of the cam member movement to efficiently prevent an important shortcoming of the prior art devices: the portion of the shifting cable leaving the adjusting screw is bent because the actual pulling angle of cable changes too much, thereby the frictional force will increase suddenly. As a result, with the derailleur of the present invention, the effort to shift a driving chain becomes uniform, the process of changing speed becomes smooth, and the control of changing speed becomes more comfortable.

So far as the design for positioning type derailleur systems is concerned, the varying speed positioning curve is an important parameter to both in the field of design and application. The curve shows the relationship between the amount of the effective extended length of the steel cable during speed changing vs. the horizontal displacement of the upper guide pulley along the axial direction of the fly wheel unit. A typical varying speed positioning curve is shown in FIG. 1A, wherein the curve being non linear. As for a conventional derailleur mechanism shown in FIG. 2A, when the adjusting screw for the derailleur is loosened or tightened to set a proper initial position for upper guide pulley, the protruding length L of the adjusting screw is varied, its result can be illustrated with the aid of FIG. 2B along with FIG. 2. During speed change, the locus of P1 is a circle with R1 as its radius. As P1 moves to P1', the incremental variation of the effective length of the steel cable may be expressed by the equation $\Delta L1 = L1' - L1$, while the above equation becomes $\Delta L2 = L2' - L2$ when the adjusting screw is protruded with a length L, where $\Delta L2$ denotes the incremental change of effective length of the steel cable. However, $\Delta L1 \neq \Delta L2$. In other words, assuming $\Delta L1 = \Delta L2$, the position P1' in both cases would not be the same which results in a different horizontal displacement of the upper guide pulley along the longitudinal direction. Therefore, when a shifting bar for changing speed is in use associated with the positioning type derailleur system owing to the restriction that the variation of effective length of the steel cable is kept at a predetermined value, result of positioning will be affected by the different protruding lengths of the adjusting screw, and even seriously, positioning function of the derailleur system will be completely lost.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1C:
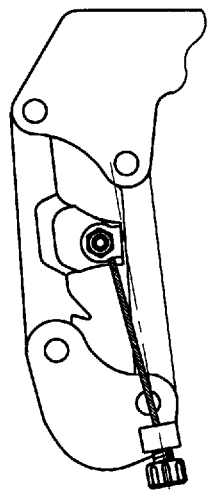
FIGS. 1A–1F show the changes in the actual pulling angle of the shifting cable ($\alpha$) in the shifting process of prior art.
Figure 1F:
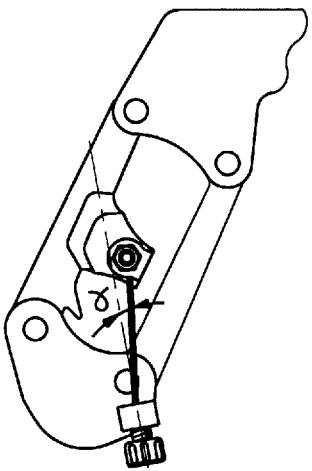
Figure 1B:
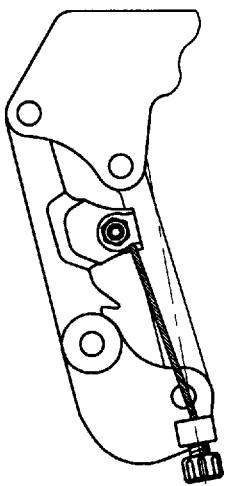
Figure 1E:
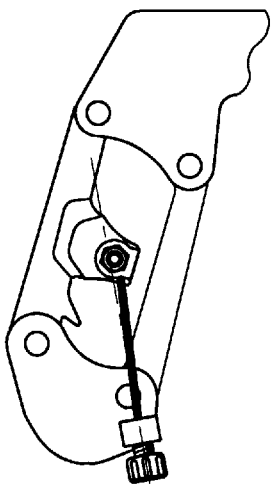
Figure 1A:
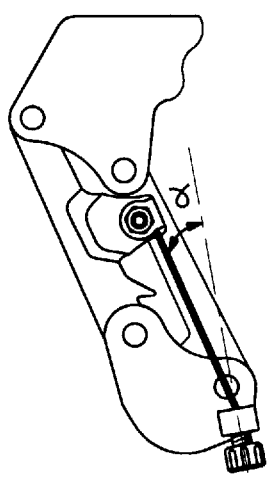
Figure 1D:
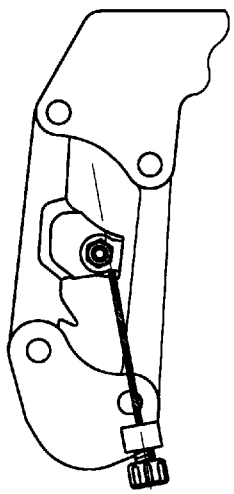
Figure 1G:
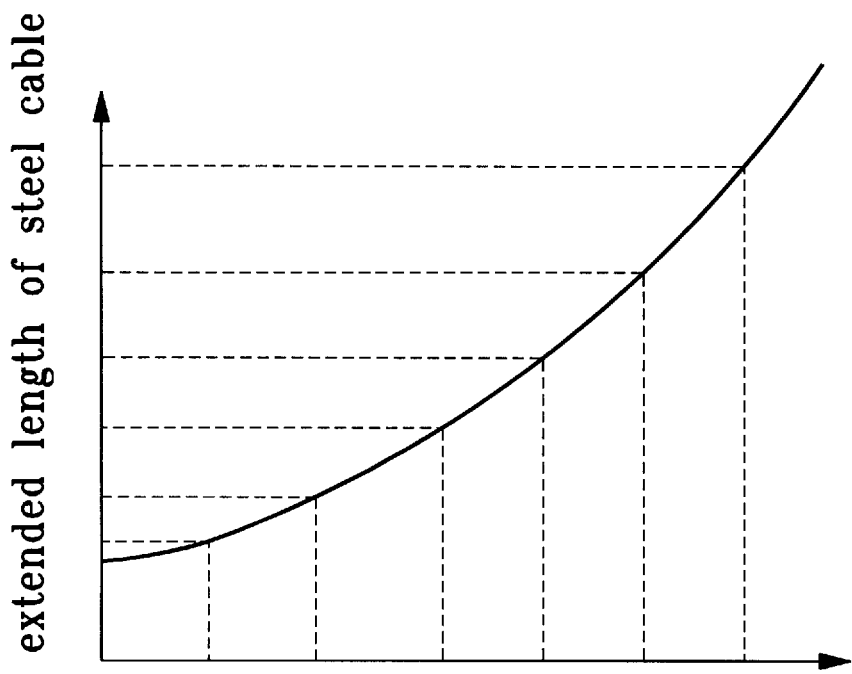
FIG. 1G is a diagram of typical shifting cable of prior art.
Figure 2A:
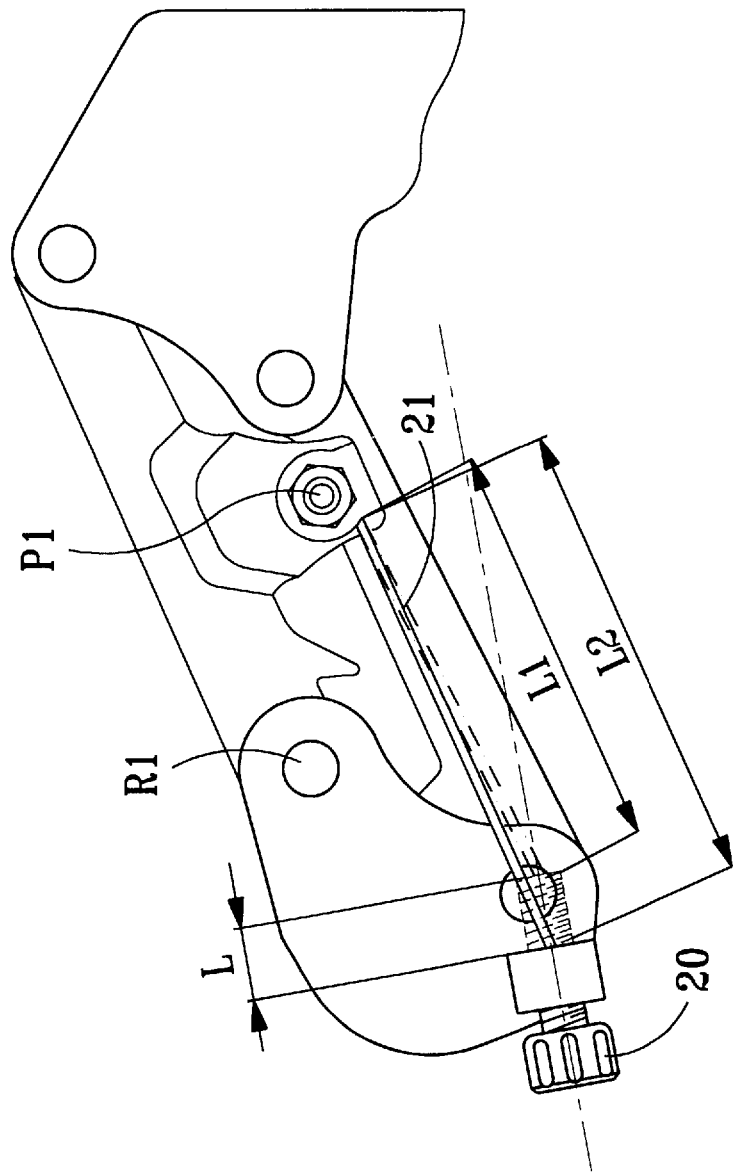
FIG. 2A is a diagram of the effect of the protruding length L of adjusting screw of prior art on the effective length (L1, L2) of cable.
Figure 2B:
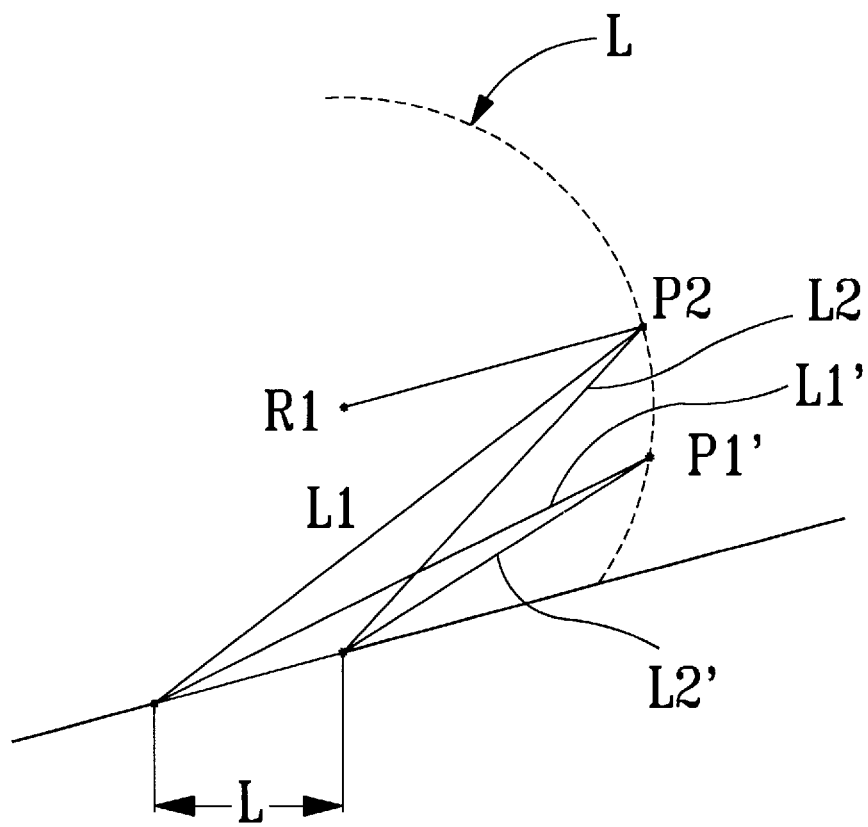
FIG. 2B is a brief diagram of mechanism of prior art on effective length (L1, L2) of cable.
Figure 3:
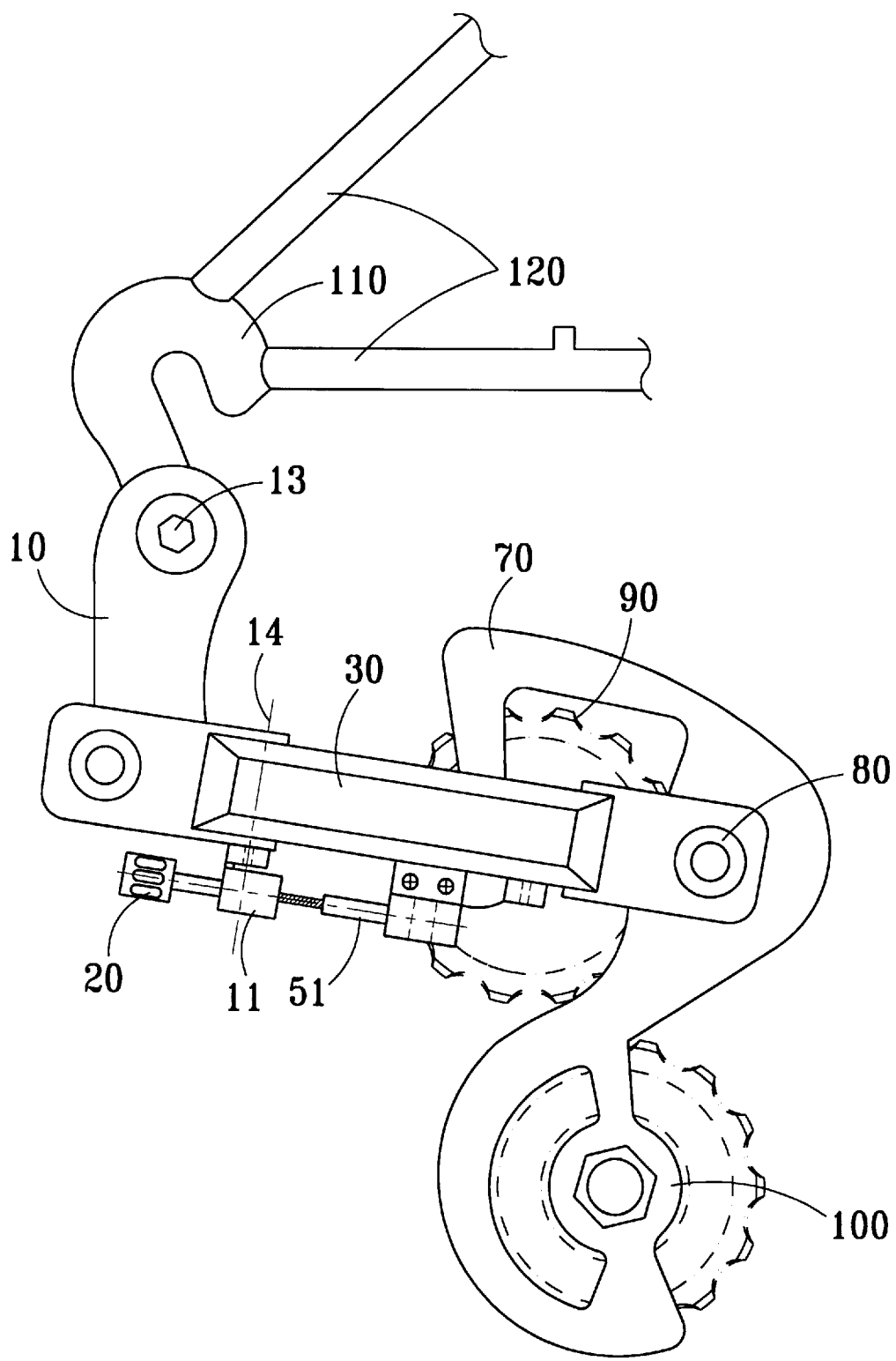
FIG. 3 is an illustrative embodiment of the structure of the present invention.
Figure 4:
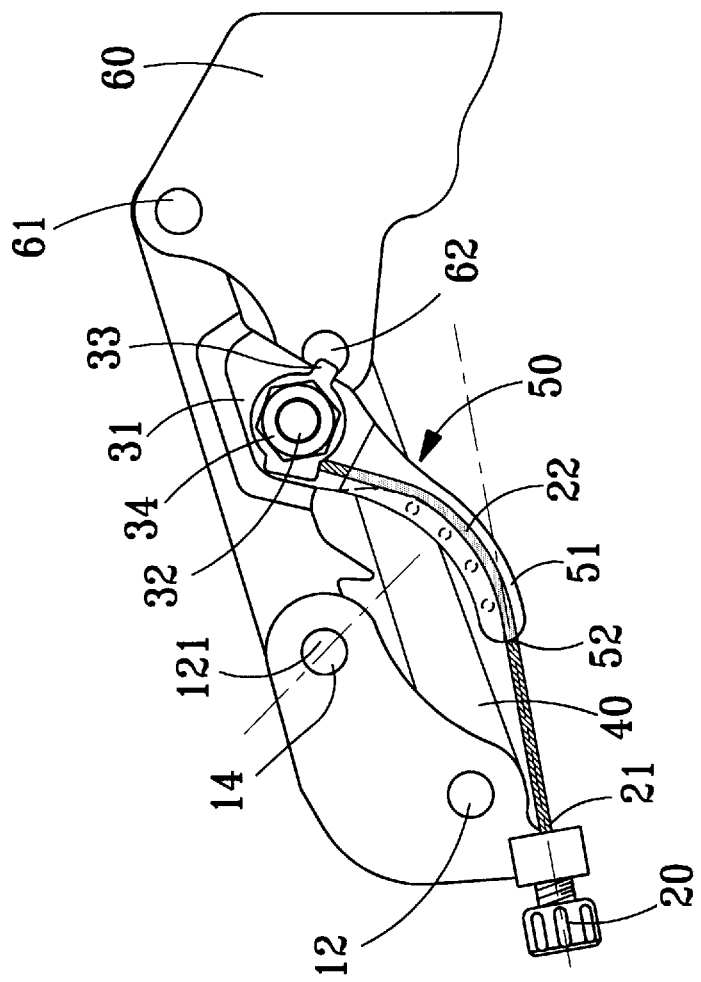
FIG. 4 is a diagram of a linkage mechanism of the present invention.

Please refer to FIG. 3 and FIG. 4 which illustrate the structure and a linkage mechanism of the present invention. The present invention mainly comprises a fixed member 10, a cable adjusting screw 20, an outer linkage 30, an inner linkage 40, a cam part 50, a moveable member 60, a chain guide 70, a upper guide pulley 90 and a lower guide pulley 100.

There is a screw socket 11 installed on the fixed member 10 for screw on the cable adjusting screw 20. One end of the fixing member 10 pins through the second rotating pin 121 to one end of the outer linkage 30. The other end of outer linkage 30 pins through the third rotating pin 61 to one end of the moveable member 60. The other end of the moveable member 60 pins through the fourth rotating pin 62 to one end of the inner linkage 40. The other end of the inner linkage 40 pins through the first rotating pin 12 to the other end of fixed member 10. Then, a parallelogram mechanism is formed.

There is an extension portion 31 extended outward from the outer linkage 30. There are the cam part 50, the fixing screw of cable 32, a screw cap 34 and a pressure washer 33 of steel cable are connected to an appropriate place of the extension portion. The upper guide pulley 90 and a lower guide pulley 100 connect the chain guide 70 respectively and connect the moveable member by a rotating pin 80. A rear derailleur is screwed to a rear fork end 110 of the rack 120 of bicycle through a fixed screw 13 of the fixed member 10.

Please refer to FIG. 4 which illustrates the parallelogram plane mechanism of the present invention. The casing of cable 22 of the derailleur is stopped at the adjusting screw 20. The cable 21 passes through the adjusting screw 20 and wraps around the profile 51 of the cam structure, then is fastened by means of the fixed screw 32 of cable, the screw cap 35 and the washer 33 of cable. After the cam part 50 connects with the extension portion 31 of outer linkage 30, the main sketch of cam portion is circular-shaped. The center of the circular is located at the extension line 14 of the axis of the second rotating pin 121. The escape portion 52 of around the two ends of tangential circular is designed for moving the cable in and out.

Figure 5:
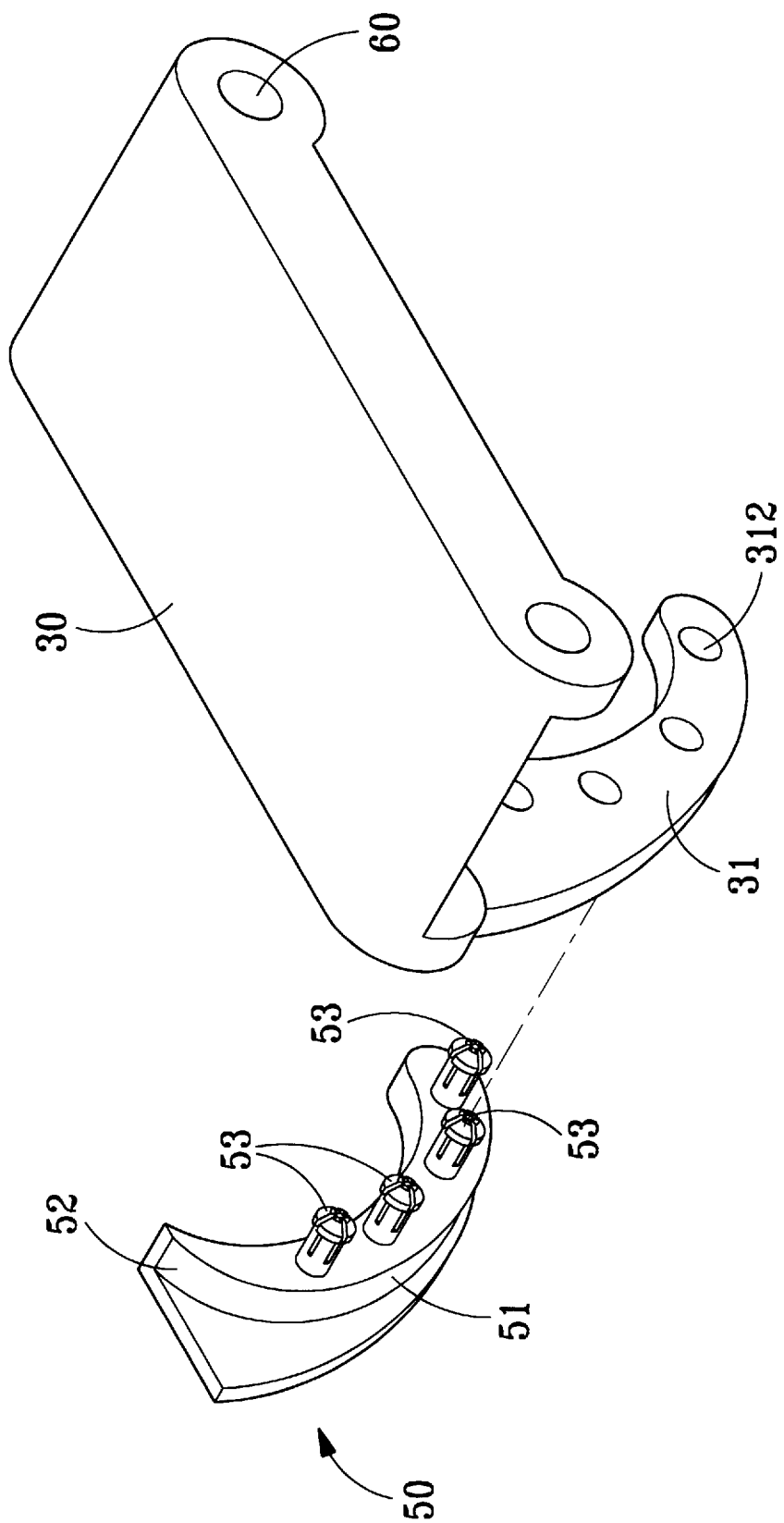
FIG. 5 is a partial assembly diagram of outter linkage and cam part of the present invention.
Figure 6C:
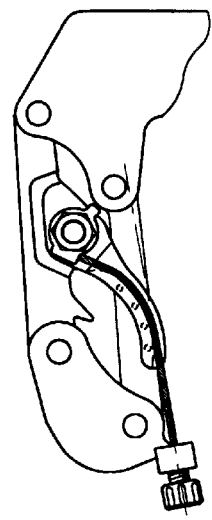
FIGS. 6A through 6F show the changes of actual pulling angle of cable during the operational process of the present invention.
Figure 6F:
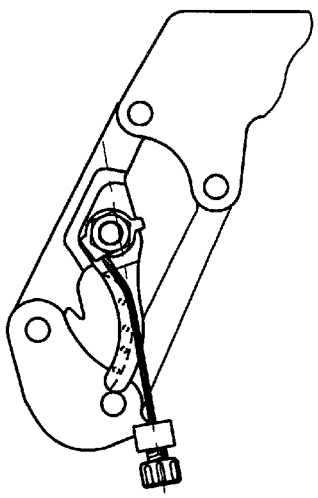
Figure 6B:
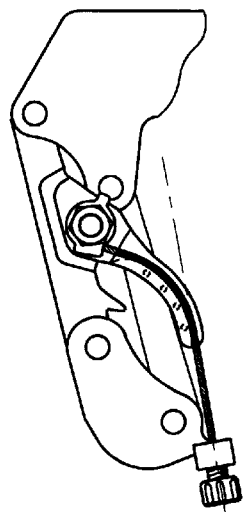
Figure 6E:
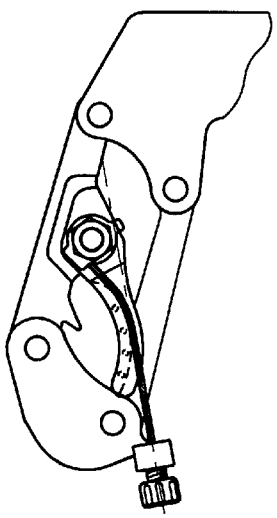
Figure 6A:
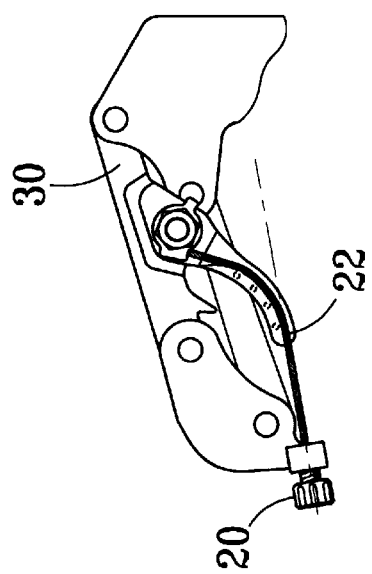
Figure 6D:
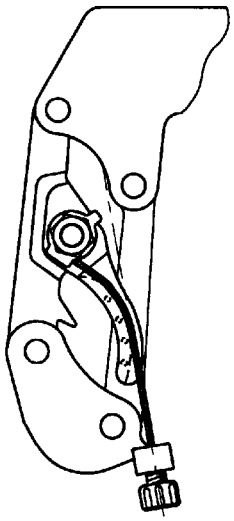

Please refer to FIG. 5 which illustrates the partial assembly of outer linkage 30 and the cam structure of the present invention. There is an extension portion 31 extended outwardly from the outer linkage 30. A hole 311 on the extension portion is screwed by the fixing screw 32 of cable. The hole is not shown in the figures. A connecting hole 312 on the extension portion is connected with cam structure 50. There are a cam structure 51 and a connecting pin 53 corresponding to a connecting hole 312 on the cam part 50. The cam part 50 is made of a low friction materials.

Please refer to FIGS. 6A through 6F illustrate the changes in actual pulling angle of the shifting cable during the shifting process of the present invention. The actual pulling angle of the cable maintains constant during the entire shifting process. In the meantime, the portion of the cable leaving the adjusting screw will not be bent and thereby there will not be an increase in the friction as observed in the prior devices. As a result, the operational force to shift a driving chain becomes uniform and the process of changing speed becomes smoother.

Figure 7:
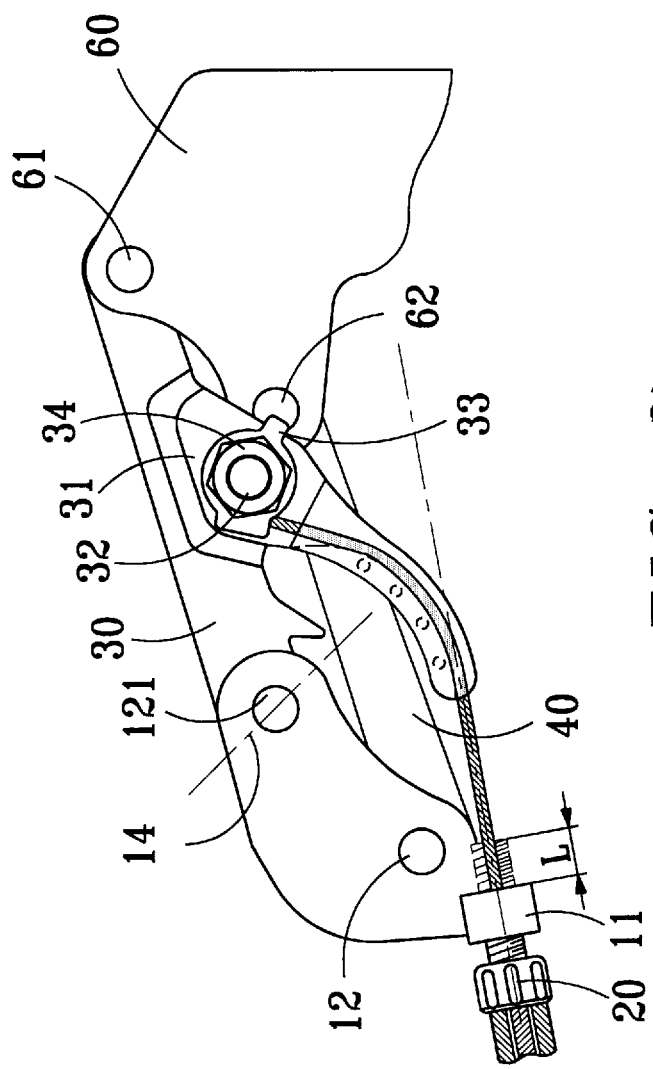
FIG. 7 is a diagram of the effect of the protruding length of adjusting screw of the present invention on the active length of steel cable.

Please refer to FIG. 7, which illustrates the effect of the protruding length of cable adjusting screw 20 of the present invention on the active length of cable. The initial position of guide pulley is slightly adjusted by screwing the adjusting screw 20 in and out, which changes the protruding length L of the screw. The active length will not be affected by the difference of the protruding length of the screw. Therefore, it can reduce the sensitivity effect of the protruding length of the adjusting length on the alignment of the rear derailleur so that the different setting position of adjusting screw will not cause the effect that will move the chain to an unintended position.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A rear derailleur for use in a bicycle which is installed on a rear fork of the bicycle for shifting a driving chain from one sprocket to another sprocket of a multi-sprocket assembly so as to change a gear ratio of the bicycle, said rear derailleur comprising:

(a) a fixed member, a movable member, and a parallelogram mechanism for connecting said fixed member with said movable member, wherein said fixed member is fixed on said rear fork at a first end of said fixed member, and said parallelogram mechanism comprises an outer linkage and an inner linkage, and first, second, third, and fourth rotating pins for respectively connecting said inner linkage with a second end of said fixed member, said outer linkage with said second end of said fixed member, said outer linkage with a first end of said movable member, and said inner linkage with said first end of said movable member;

(b) an upper guide pulley and a lower guide pulley respectively connected to a chain guide, which is connected to said movable member via a fifth rotating pin;

(c) a cable adjusting screw having a screw length and is screwed to a screw socket fixed on said fixed member, said cable adjusting screw is connected to a first end of a cable, wherein said cable has a second end fixed to said movable member;

(d) an extension member extended from said outer linkage, and means for connecting said extension member with a cam member;

(e) wherein said cam member comprises a guiding surface for guiding said cable between said cable adjusting screw and said movable member, and said guiding surface of said cam member is structured substantially coinciding a portion of a fictitious circle centered at said second rotating pin and said cable adjusting screw is positioned in such a manner that an extension of said cable adjusting screw is always substantially tangential to said guiding surface, so as to allow said cable to be pulled in a direction substantially coincident with said axial extension of said cable adjusting screw.

2. The rear derailleur for use in a bicycle according to claim 1 wherein said means for connecting said extension member with said cam member comprises a plurality of holes provided on said extension and a plurality of matching protrusions provided on said cam member.

* * * * *